United States Patent
Fontanel et al.

[11] 3,721,954
[45] March 20, 1973

[54] METHOD FOR SURFACES EXPLORATION ADAPTED IN PARTICULAR TO SEISMIC PROSPECTING AND DEVICE THEREFOR

[75] Inventors: Andre Fontanel, 92 Asnieres (Hauts de Seine); Gerard Grau, Paris XVII eme, both of France

[73] Assignee: Institut Francais du Petrole des Carburants et Lubrifiants, Rueil Malmaison, France

[22] Filed: May 14, 1970

[21] Appl. No.: 37,146

[30] Foreign Application Priority Data

May 14, 1969 France..................................6915820

[52] U.S. Cl......................340/15.5 TC, 340/15.5 CP
[51] Int. Cl. ...........................................G01v 1/28
[58] Field of Search.....340/15.5 TC, 15.5 CP; 181/.5

[56] References Cited

UNITED STATES PATENTS

3,182,743   5/1965   McCollum.....................340/15.5 TC
3,365,697   1/1968   Fail et al............................340/15.5

Primary Examiner—Benjamin A. Borchelt
Assistant Examiner—N. Moskowitz
Attorney—Craig, Antonelli & Hill

[57] ABSTRACT

Method for exploration of surfaces in a surveyed zone, particularly discontinuities of the subsurface strata which comprises transmitting acoustic or radio wave trains at a substantially constant frequency from at least one point during a time interval at least equal to the travel time of the waves over twice the distance between two limit points of said surveyed zone, receiving and recording the waves reflected and diffracted from said discontinuities during at least half a period of the transmitted wave train, determining one number representative of the amplitude and one number representative of the phase from each recording and using said two numbers from each recording to restore the surface or discontinuities of the surveyed zone.

14 Claims, 10 Drawing Figures

METHOD FOR SURFACES EXPLORATION ADAPTED IN PARTICULAR TO SEISMIC PROSPECTING AND DEVICE THEREFOR

The present invention relates to a new method for exploration of surfaces formed by discontinuities, particularly adapted for seismic prospecting, according to which there is transmitted in the surveyed medium, in a continuous manner, a monochromatic acoustic or radio wave (i.e a wave having a narrow frequency spectrum, stable in the course of time) during a time interval the minimum value of which is dependent, in the case of seismic prospecting, on the thickness of the surveyed strata. There are received, by means of receivers such as seismographs, the various waves reflected or diffracted by the various discontinuities of the surveyed medium for a given emission, and, only after a certain time corresponding to the forward and back travel time of the waves for the most remote discontinuity, the vibrating state at the receiving place is characterized by the recording of only two values at each receiver, one relating to the amplitude of the vibration and the other to its phase. The recording time necessary for obtaining these two values may be very short and as short as half a period of the transmitted signal. The resulting recording is then used for restoring, e.g by calculation, and at their actual position in the surveyed medium, both the images of the transmission source and/or the receiving points with respect to the surfaces of discontinuity and consequently, by degrees, said discontinuities themselves, as well as the diffraction points which, in the case of seismic prospecting, generally correspond to subsurface features (e.g a fault).

A particular attention will now be paid to the use of this method in seismic prospecting.

According to a conventional method of seismic prospecting there is transmitted into the ground acoustic waves of short duration, generated for example by an exploding charge and simultaneously there is actuated a device for receiving and recording the signals produced by the waves reflected from the various strata within a relatively long time corresponding to at least the travel time of the waves reflected by the deeper sub-surface layer to be explored. In order to obtain satisfactory results there is generally used a plurality of seismographs or groups of seismographs (e.g, 24 seismographs in line). The different traces thus obtained are subjected to static and dynamic corrections. They must for example be shifted with respect to one another, particularly when it is desired to carry out a so-called "multiple coverage" of the mirrors according to the method described in U.S. Pat. specification No. 2,732,906 to MAYNE.

The new method of this invention has the advantage of requiring only a small bulk of recorded data since only two values are kept as representative of each "trace" instead of 6,000 according to the conventional method when taking one sample at each millisecond. Moreover this method provides for the "multiple coverage" of the various geological strata, without paying attention, as it is usually the case, to the respective distances between the transmitting and receiving points.

The method of this invention will be further described more in detail with reference to the accompanying drawings wherein.

According to the new method of the invention, as applied to seismic prospecting, there is radiated into the ground, a sustained sine wave. This wave can be generated, for example, by a vibrator of the conventional type.

The frequency of this signal will be for example between 15 and 100 Hertz. It will be determined with an accuracy of a few cycles or cycle fractions according to the thickness of the ground layer which has to be explored. A greater thickness will correspond to a greater accuracy of the frequency of emission.

The amplitude of the sine wave may be varied during time so as to compensate for the attenuation of the waves during the propagation thereof, the higher amplitudes corresponding to the beginning of the transmission.

The length of the wave train must be at least twice the travel time of the waves over the distance between two extreme mirrors of the ground layer to be explored.

Figure 1:
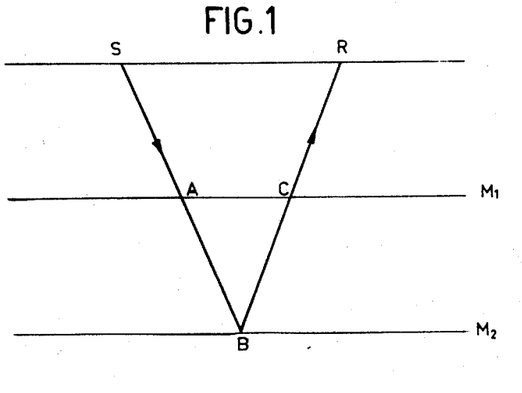
FIG. 1 diagrammatically shows the travel of a transmitted wave train reflected by a deep sub-surface layer.

Referring to FIG. 1 wherein $M_1$ is the most superficial mirror and $M_2$ the deepest mirror of the sub-surface layer to be explored, S being the seismic wave source on the ground, the length of the wave train will be at least the travel time of the acoustic wave over the path ABC, B being the point of reflection of the wave train on the deepest mirror $M_2$. The length of the wave train may be as long as, for example, 6 seconds.

The reception is effected by means of a receiving device R(FIG. 1) placed at the ground surface and whose reception frequency is tuned to the transmission frequency. The reception time is short. As a matter of fact each reflecting layer of the sub-surface in the interval between $M_1$ and $M_2$ reflects towards the surface a sine wave, their phase difference are constant and their beatings generate at the surface a state of stationary interferences.

Each point at the ground surface thus vibrates according to a sinusoid having the same frequency as the transmitted sine wave, but with an amplitude and a phase which vary from one point to another. The transmitted sine wave having a length of at least twice the travel time from $M_1$ to $M_2$ and the frequency spectrum being narrow enough, it is sufficient, starting from the time at which the waves reflected by the deepest mirror $M_2$ reach the ground surface, to determine and record the maximum amplitude and the phase of the vibration at each receiving point for restoring all the mirrors and diffracting points located between $M_1$ and $M_2$.

The receiving and recording time may be accordingly very short, since basically half a period is sufficient for the determination of the above mentioned parameters. In fact, in view of increasing the signal to noise ratio, it may be convenient to extend the recording time to n periods (for example $n = 10$). The summation of these n periods is thereafter effected whereby the ratio of signal to noise is increased by a factor of $\sqrt{n}$.

In all cases, after this summation is achieved, only two values are kept and recorded at each receiving point, one being the average amplitude of the vibration at this point, the other being the phase shift thereof with respect to the transmitted sine wave.

Thus, even when recording over several periods, the length of the received reflected signal may be only a few tens of milliseconds, whereas in conventional seismic methods the length of the received signal is generally 6 seconds.

Figure 2:
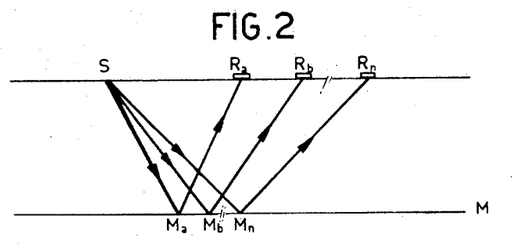
FIG. 2 diagrammatically illustrates the principle of a conventional prospecting method.

In order to better understood the principle on which is based the method of the invention, it will be useful to refer to the usual seismic prospecting method, as illustrated in FIG. 2.

Figure 3:
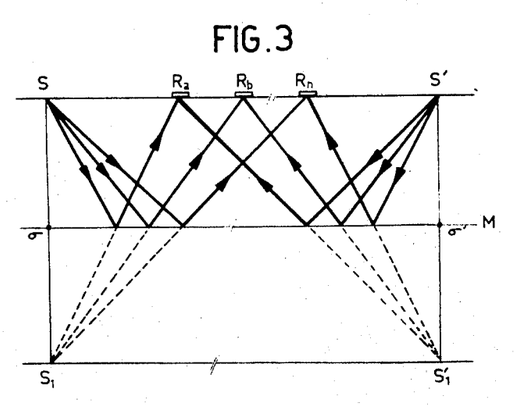
FIG. 3 diagrammatically illustrates the principle of the prospecting method according to the invention, FIG. 3 A diagrammatically illustrates the principle of the transposed prospecting method according to the invention.

According to this method, acoustic waves are transmitted from a seismic source S at the ground surface. The acoustic energy may be transmitted for example as a pulse in the case of a dynamite explosion or as a long signal when using vibrators. In both cases receivers or groups of receivers $Ra$, $Rb$ ... $Rn$, laid in line on the ground surface, receive the waves radiated from S and reflected by mirror M at the reflection points $Ma$, $Mb$ .. . $Mn$. There is then detected, in a known manner, the location of the reflection points $Ma$, $Mb$, ... $Mn$ and consequently of mirror M by plotting on the recorded traces the phase relationship between the waves reflected by these various points. When utilizing, as it is usual, 24 receivers, there are restored accordingly 24 points of mirror M, each restored point corresponding to a single path such as $S\,Ma\,Ra$. According to the method of this invention acoustic waves are transmitted, as in the conventional method, from a source S (FIG. 3) placed on the ground surface, but this source must obligatorily transmit sine waves. Receivers $Ra$, $Rb$, ... $Rn$ receive the waves radiated from S and reflected by mirror M. However, by the restoring stage, the detected points are not the reflection points $Ma$, $Mb$, ... $Mn$, but the single image $S_1$ of source S with respect to mirror M. It is deduced therefrom the position of point $\sigma$ of mirror M at half-way between points S and $S_1$. When, as in the preceding case, there is used 24 receivers, the 24 corresponding recordings will be used for restoring a single point, i.e the image $S_1$ of source S. Said point S is thus restored by using 24 different travel paths, this being a convenient way for improving the signal to noise ratio. There can be also simultaneously utilized a plurality of seismic sources S, S', ... (FIG. 3). The restoration of the images will always be obtained from the same recording extended only over n periods ($n = 10$, for example). To each of the transmission point will be associated the image point $S_1$ or $S'_1$ given by mirror M. By multiplying the points of simultaneous transmissions there can be obtained a multiplicity of image points of the sources whereby mirror M can be easily restored. Of course, the same result may be obtained with successive transmissions by separately treating each of the recordings.

Figure 3A:
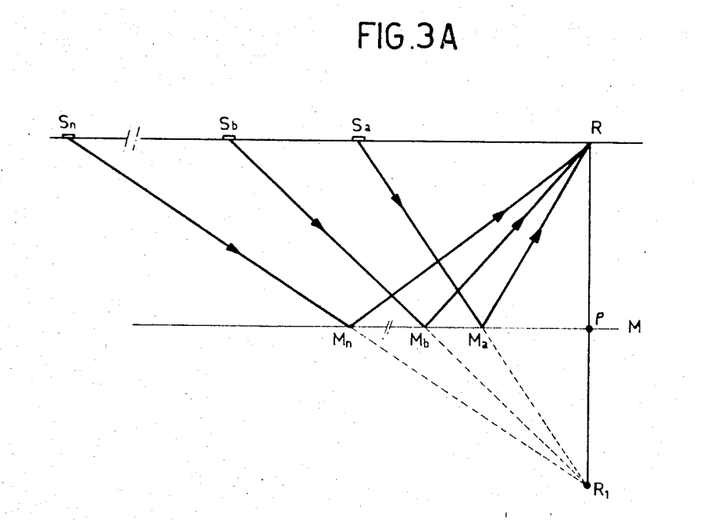

There can also be used (FIG. 3 A) different recordings obtained from the same receiving device R of separate shots effected at different locations $Sa$, $Sb$, ... $Sn$.

This method will be called, as in the conventional seismology, a transposed method, in contrast to the so-called normal method as illustrated in FIGS. 2 and 3. From the data recorded in R and corresponding to the paths $Sa\,Ma\,R$, $Sb\,Mb\,R$, ... $Sn\,Mn\,R$, the image $R_1$ of R in mirror M may be restored and point $\rho$ thereof is deduced therefrom.

It can be seen that when the system comprises several receiving points and a single transmitting source (direct method) the image of the source can be restored, whereas in the case of a plurality of transmission points and a single receiver (transposed method) the restored image is that of the receiving point, provided that the transmissions are not simultaneous. When several sources are simultaneously transmitting and a single receiver is used, restoration is no longer possible due to an insufficient number of information data. In the case of several receivers and several sources, there are restored the same number of images as the number of receivers and sources, provided however that simultaneous transmissions from several sources in the case of a plurality of sources, are received by several receivers.

Figure 4:
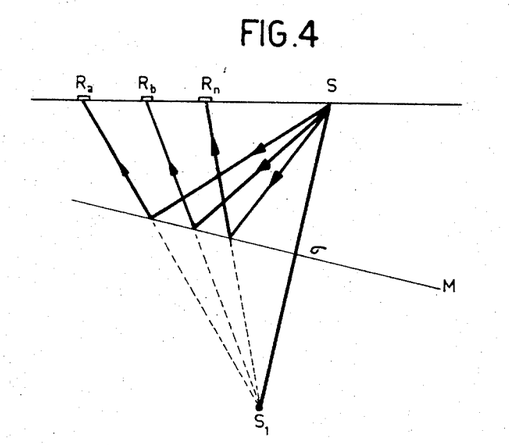
FIG. 4 diagrammatically illustrates the principle of the method of this invention in the case of an inclined mirror.

When the mirror is horizontal (FIG. 3) each image point will be located at the vertical of the transmission point (direct method). But in the case of an inclined mirror (FIG. 4), it will be normally restored at its actual position. When the recording is effected along a single direction, i.e, when all of the seismographs are in line, it can be assumed that point $S'_1$ (FIG. 4) is located in the vertical plane passing through this line. On the contrary, if the seismographs have been placed along two directions the image $S_1$ can be restored irrespective of its sub-surface position.

The method of this invention thus provides for an operating technique similar to that of the "multiple coverage" since to each restored point corresponds a number of separate wave paths equal to the number of receivers of the device. It is thus possible to practice the method in an easily adaptable manner since from each emission can be restored the different mirrors with a multiple coverage, without paying attention to what has been or will be the next emission point as well as the associated receiving device. It is not necessary, as in the conventional method, to sum up the recordings which correspond to well selected emission and reception points in order that the reflection points on the mirrors be common. The static corrections have in this method the same importance as in the case of the usual seismic prospecting. Concerning the dynamic corrections they are, as set forth hereafter, a part of the restoring procedure, this implying of course, that the velocities of the acoustic waves through the sub-surface formations are known. Each point of the mirror is then systematically restored by means of several beams, the "coverage degree" being equal to the number of recorded traces used for restoring this point.

When a body or a formation anomaly diffracts or diffuses the seismic energy, it forwards informations to all of the receivers and the method of the invention provide means for restoring the image of said body at its true position; in fact said point acts as the above-mentioned sources $S_1$ and $S'_1$. The degree of "coverage" for a diffracting point is equal to the number of different paths from this point to the receivers. In the case of simultaneous or successive emissions this number is equal to the product of the number of emission sources which have energized the diffracting point by the number of receivers of the device. After the restoring stage, there is no longer observed on the records the presence of diffraction hyperboles as it is the case in conventional seismic prospecting, but only the image of the diffracting point, at its true position in the sub-surfaca formations. The receivers can be placed on the ground along two directions or a single direction, i.e in line, as in conventional seismic prospecting.

The size of the receiving device is not as in the case of conventional seismic prospecting, in relation with the length of the mirror to be detected at each emission, but of the resolution with which it is desired to restore the image of the different emission sources. The more expanded the device along one or two directions, the higher will be accuracy in the case of a plane mirror.

It is also necessary to determine approximately the distance which must separate the different receivers or the transmission sources.

Figure 5:
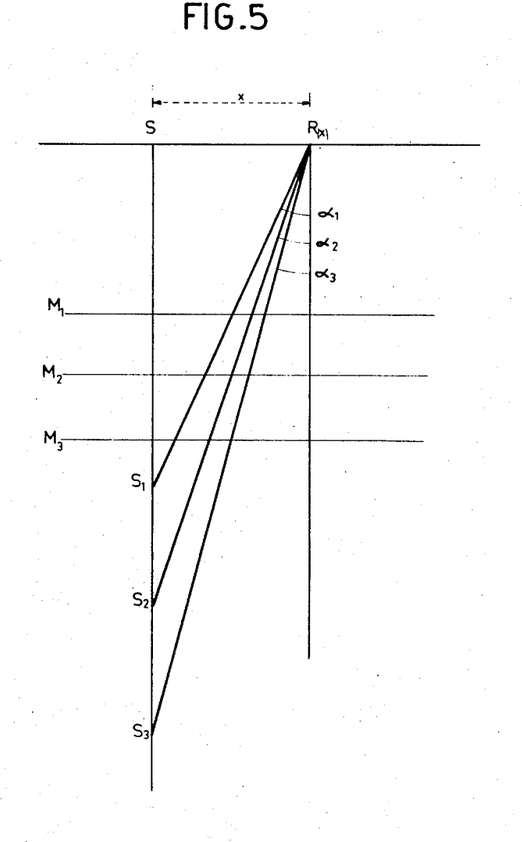
FIG. 5 shows the location of the receiving device with respect to the transmitting source, in the case of a plurality of mirrors.

Referring now to FIG. 5, S indicates a transmission source at the ground surface. $S_1$ is the image point of source S with respect to mirror $M_1$ i.e, the most superficial mirror which it is desired to restore. This mirror will be assumed horizontal. $R(x)$ being a seismograph placed at the ground surface at a distance $x$ from point S, there must be recorded at point $R(x)$ and in the vicinity thereof, a spatial frequency $k$, expressed in cycles per meter, given by the formula $$k = fo/V \sin \alpha_1$$

wherein $fo$ is the emission frequency in Hertz, V is the propagation velocity, expressed in m/s, of the waves through the formations which are assumed homogeneous, and $\alpha_1$ the angle of slope of the beam $S_1 R(x)$ with respect to the vertical at $R(x)$.

The spatial frequency thus increases with an increasing angle $\alpha_1$. If it does exist other mirrors $M_2, M_3 \ldots M_n$ deeper than mirror $M_1$, they will give image points $S_2$, $S_3, \ldots S_n$ of source S. The waves received at $R(x)$, corresponding to these image sources add up to one another and, at said point $R(x)$, the spectrum of the spatial frequencies corresponds to the sum of elementary spectra, each relating to a separate source $S_1, S_2$.

The spatial frequencies received by the receiving device increase with an increasing distance $x$ and, at each receiving point, the higher frequency to be recorded, corresponding to the shortest wave length, is that produced at this point by the waves reflected from the most superficial mirror $M_1$, giving the image point $S_1$.

It will be therefore advantageous to make use of a device wherein the spacing between the various receivers will vary in relation with their distance $x$ from the source S, the maximum spacing corresponding to the receivers which are the closer to the emission point S.

When, for example, the most superficial image point $S_1$ of the source is at a depth of 300 meters, the spatial period $\lambda'$ of the ground movement generated by the reflection on mirror M at a reception point at a distance of 500 meters from emission point S, will be:

$$\lambda' = \lambda/(\sin \alpha_1)$$

with $\lambda = V/fo$ wherein
V = velocity of the acoustic waves
$fo$ = emission frequency In this case $\sin \alpha_1$ has a value substantially equal to 0.5 and accordingly $\lambda' \# 2\lambda$.

On the contrary, for a receiving point at the ground surface, at a distance of 1,500 meters from the emission source S, the value of $\sin \alpha_1$ is substantially equal to 0.98 and the spatial period approximately equal to $\lambda$.

Consequently, at a distance of 1,500 meters from the emission point, the maximum spacing between two adjacent receivers at the ground surface will be one half of the corresponding spacing at a distance of about 500 meters.

The step of the method following the receiving-recording step carried out by means of seismographs, is the restoration step.

The principle of the restoration in the direct method consists to imagine that the seismographs are now sources of sine elastic waves and to combine by calculation these various movements with one another. If the imaginary elastic waves "generated" by the seismographs are the same as those to which they have been subjected during the recording, the combination of all of these imaginary movements must restore the different image points of the emission sources.

Figure 6:
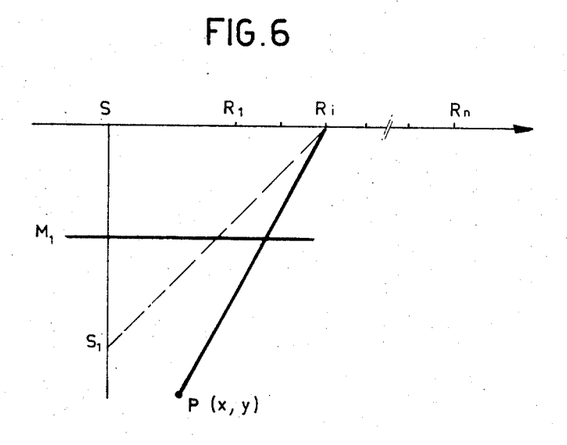
FIG. 6 illustrates a device comprising n receiving units in line with the transmission source and the principle of restoration.

FIG. 6 illustrates a device composed of n seismographs in line, placed for example on the same side with respect to the emission point S. At the recording, each of said seismographs $R_i$, associated to a device described hereunder, has recorded the amplitude $a_i$ of the vibration at the corresponding point of the device, as well as its phase $\phi i$, the origin of the phases being for example chosen at emission point S.

In each record at a corresponding seismograph the term expressing the phase will thus be:

$$\phi i = 2\pi/\lambda \, S_1 R_i$$

A restoration method will be described below by way of example.

At each point $P(x,y)$ (FIG. 6) of the vertical plane passing at the device location, the various waves transmitted by the different seismographs $R_i$ are combined with an amplitude $a_1$ and a phase $2\pi/\lambda \, S_1 R_i$.

Accordingly at a point P, with coordinates $x$ and $y$, the resulting complex amplitude will be:

$$\mathcal{P}(x, y) = \sum_{i=1}^{n} a_i e^{\frac{2\pi j}{\lambda}(S_1 R_i - P R_i)}$$

with $j^2 = -1$

It is clearly apparent that, in the case of a single mirror $M_1$, when point P coincides with the single source $S_1$ corresponding to $M_1$, the difference $S_1R_i - PR_i$ becomes zero in all the terms of the sum and the modulus of the complex amplitude $\tau$ obtained at P will be maximum.

In the case of numerous image points $S_1, S_2, \ldots S_n$ (FIG. 5), at each time where point P will coincide with one of these points a relative maximum of the modulus will be obtained at the restoration step. There is thus assigned to each point $P(x,y)$ of the vertical plane passing at the device location, a value $|\tau(x,y)|$ modulus of $\tau$, and there are recorded on a paper or film, according to a well known method, the high amplitudes of $|\tau|$ with high photographic densities and the low amplitudes with low densities. It results therefrom a showing of a vertical cross-section of the sub-surface where the seismic horizons are indicated by successive images of the source (direct method) or by images of the receivers (transposed method).

Figure 7:
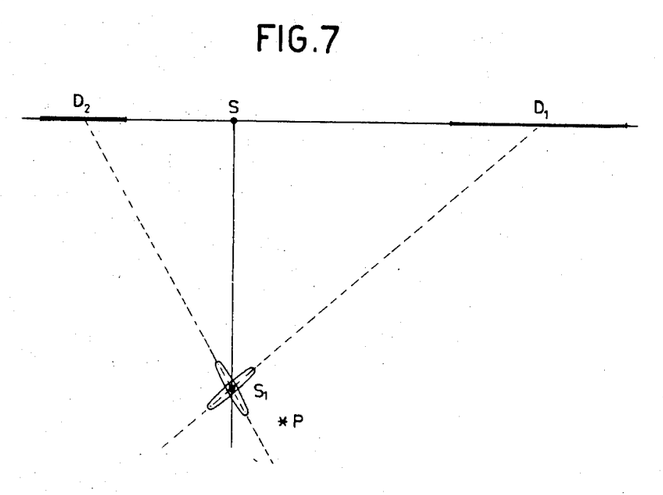
FIG. 7 illustrates the restoration image obtained according to the invention with the use of two receiving devices.

FIG. 6 illustrates the use of a device arranged in line according to the direct method, placed entirely on one side of the emission point S. In fact it could be of interest in such a case, in order to obtain a high resolution, to distribute the receivers in two groups $D_1$ and $D_2$ on both sides of point S, as shown in FIG. 7, the recordings obtained at $D_1$ and $D_2$ being either simultaneous or successive. In both cases two kinds of treatments are possible according to the fact that $D_1$ and $D_2$ can be considered as an assembly forming a single device or, on the contrary, as two separate devices whose recordings have to be treated separately. In the latter case, to each point of the plane, such as $P(x,y)$ as defined in FIG. 7, will be assigned two values, one corresponding to $D_1$ and the other to $D_2$. It will then be convenient, by combining these two values, to arbitrarily assign to P a true number, so that the so-obtained resolution on $S_1$ be the better possible.

The device for practicing the invention will be described hereinafter with reference to FIGS. 8 and 9.

Figure 8:
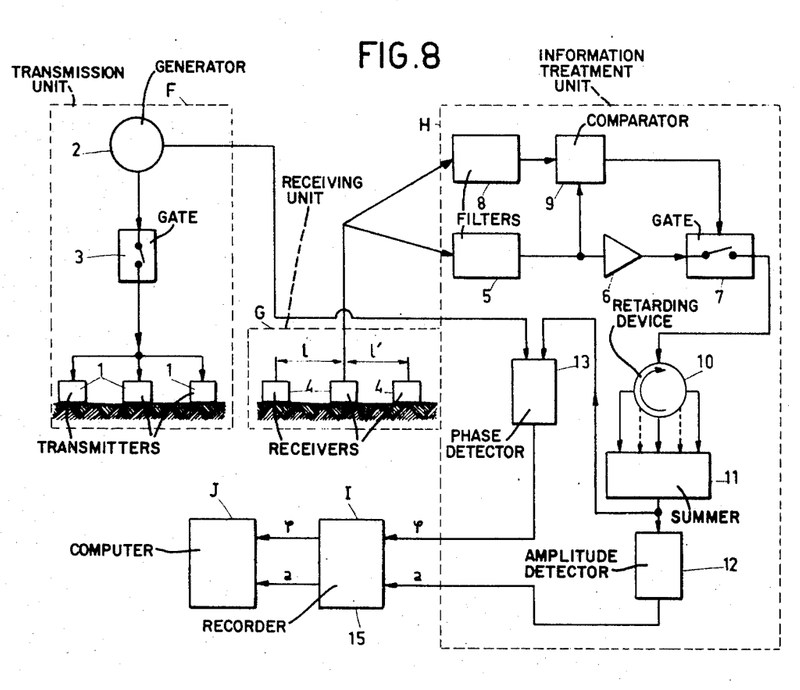
FIG. 8 diagrammatically shows a first embodiment of the device for practicing the method of the invention, and FIG. 9 diagrammatically shows a second embodiment of the device for practicing the invention.

According to a first embodiment described by way of example and shown in FIG. 8, the assembly of the device of this invention comprises a transmission device F, a receiving device G, a device H for the treatment of the informations, a recording device I and a computer J.

The emission device comprises for example one or more vibrators 1, each transmitting s sine-wave signal of frequency $f_o$, said vibrators having their energizing current supplied either from a single generator 2 or from a separate generator for each vibrator. An electronic gate 3, placed in the circuit between generator 2 and vibrators 1, is provided for issuing a transmission signal over the desired time interval, i.e, in the present case, during the time interval required for the travel of the acoustic waves through the surveyed vertical ground layer and back.

When the different vibrators 1 are electrically interconnected, they can be placed on the ground in such a manner as to neutralize the surface noise, as already known.

The receiving device G comprises a receiving unit 4 per each trace to be recorded. Each receiver may comprise a plurality of detectors so as to improve the ratio of signal to noise, as also known. The device H for treatment of informations, placed on the ground, comprises an electric band-pass filter 5 centered on the transmission frequency $f_o$ and adapted to the band width of the transmitted signal. The signal issuing from filter 5 is then amplified in amplifier 6. An electronic gate 7 placed in the circuit after amplifier 6 gives passage only to n periods of the signal, i.e it is open only during a time interval $\Delta t = n/f_o$.

The number n depends on the relative levels of signal and noise at the recording. The higher the ratio signal/noise, the smaller will be number $n$. As a limit $n$ could be as small as ½ period. In practice it will be more convenient to take a whole number as value of n.

The value of the ratio signal/noise which determines n is obtained by use of an electric filter 8 with a wide band-pass centered on the transmission frequency $f_o$ and an electronic comparator 9 receiving the signals issued respectively from filters 5 and 8 and comparing them. It generates a signal which is a function of the ratio signal/noise and is supplied to gate 7 for controlling the opening time thereof.

The signal issued from gate 7 is supplied to a retarding device 10 comprising one inlet channel and n outlet channels corresponding to the n periods retained by gate 7. This retarding device may consist of a magnetic drum revolving at constant speed. Stationary magnetic reading heads are placed around said drum with equal spacings so that the travel time of a point of the drum over the spacing separating two successive heads is equal to the period $T_o = 1/f_o$ of the transmitted signal.

The n outlet channels of the retarding device lead to a summation device 11, which generates a signal in the form of a sine period corresponding to the average value of the n periods supplied thereto within the time interval $\Delta t = n/f_o$.

An amplitude detector 12 measures the maximum amplitude a of the sine-signal issuing from the summation apparatus 11. The device for treatment of informations further comprises a phase detector 13 receiving a signal directly issuing from generator 2 and the signal issuing from the summation device 11 and measuring the phase shift $\phi$ between said two signals.

The recording device I comprises a magnetic recorder 15, preferably of a digital type, recording, for each receiver, the value of the amplitude a given by detector 12 and the phase shift given by detector 13; i.e, in the case of a shot comprising 24 traces, there will be only 48 values to be recorded.

A computer J, placed in the circuit after the recorder, provides for the automatic restoration, from the different values of a and $\phi$, in accordance with the above-described method.

The images of the source or of the receivers are then represented by a distribution of true numbers in a vertical cross-section of the sub-surface passing at S and $R_i$ when the device is laid in line.

Where high members are present there can be located the image of a source.

Figure 9:
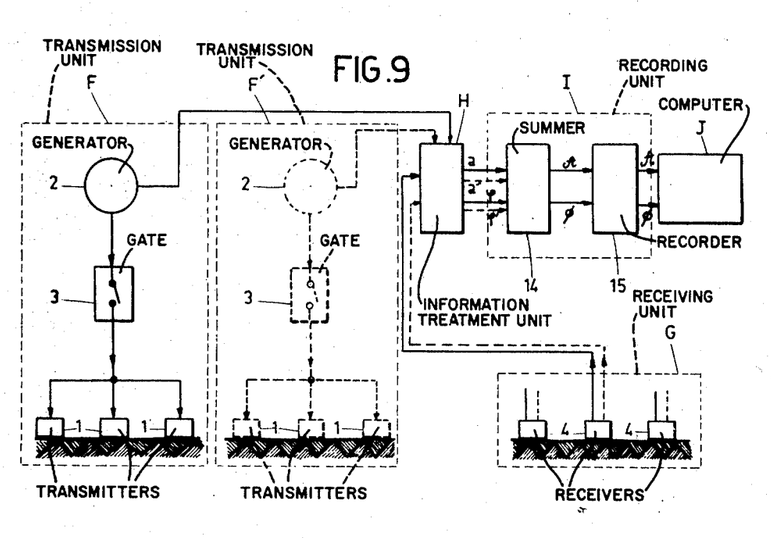

According to a second embodiment of the device of this invention, as illustrated in FIG. 9, this device comprises a transmission device F, similar to device F of FIG. 8, transmitting a signal starting from time t. A second transmission device F', similar to device F, transmits an identical signal at time $t + \Delta t$. The time shift $\Delta t$ must be either zero or greater than the length of the transmitted signal.

The receiving device G is identical to that of FIG. 8.

The device H for treatment of the received informations is also identical to that of FIG. 8 and issues the phase shift between the transmitted signal and the received signal as well as the maximum amplitude of the sine-signal received at each receiver. In the case where $\Delta t = 0$, the two signals are simultaneously transmitted and the reception and treatment are carried out as in the preceding case (FIG. 8), but, at the restoration stage, there are obtained two images instead of one. When $\Delta t \neq 0$ there are two transmission signals with a time shift therebetween issued respectively from devices F and F'; the device for carrying out the treatment then issues successively two measuring values $a$ and $a'$ of the amplitude and two measuring values $\phi$ and $\phi'$ of the phase shift.

The recording device I comprises a memory associated to a summation device indicated by reference 14. The memory temporarily keeps the informations, relating to $a$ and $\phi$, issued from the transmission device F, the informations $a'$ and $\phi'$, issued from F', and the summation device gives the amplitude:

$$A = \sqrt{(a\cos\phi + a'\cos\phi')^2 + (a\sin\phi + a'\sin\phi')^2}$$

and the phase $$\Phi = \text{Arc } tg(a\sin\phi + a'\sin\phi')/(a\cos\phi + a'\cos\phi')$$

The recorder 15 records the values of A and $\Phi$. It must be understood that several transmission devices can be used under the same conditions.

A computer J, similar to that shown in FIG. 8, completes the device of the invention.

All of these operations may be repeated at different frequencies. The restoration operations may be effected separately and added to one another. There can be added the different values of complex amplitudes A obtained at each of the points for the different frequencies and the modulus of their sum determined. The above-mentioned examples are relating to the case where receivers are in line, (FIG. 6) which is insufficient as information for a restoration in three dimensions, i.e in volume. If such a restoration is desired, it is obvious that the receivers will not have to be placed along a straight line but to be distributed over a whole surface.

The preceding examples have been described on the base of the use as transmission source of vibrators transmitting waves to the ground. Of course, there can be used any other source of monochromatic acoustic waves, for example ultra sonic waves generators, in a liquid medium, without departing from the scope of the present invention. In such a case the receivers may consist of piezoelectric materials. It is thus possible, by using the method of the invention to explore, for example, underwater topographic surfaces, or the surface of the walls of wells. It can be also contemplated, by this method, to explore the internal parts of an organism, such biological studies usually requiring dissection or photography with X rays or $\gamma$ rays.

There can also be used radio-wave transmitters and the receivers associated thereto.

From the for foregoing description, one skilled in the art can easily ascertain the essential characteristics of the invention, and, without departing from the spirit and scope thereof, can make various changes and modifications of the invention to adapt it to various usages and conditions. Consequently such changes and modifications are properly, equitably and intended to be within the full range of equivalence of the following claims.

What we claim is:

1. Method for exploration at a distance from surfaces and discontinuities of a surveyed medium, adapted in particular to seismic prospecting of subterranean surfaces, comprising transmitting from at least one point and receiving in at least one point, waves selected from acoustic- or radio-waves, said transmission and reception points being remote from said surface, wherein at one transmission point is transmitted a wave-train of substantially constant frequency and of a length at least equal to the travel time of the waves over twice the distance between two limit points of the surveyed zone, at each receiving point, the reflected and diffracted waves are received and recorded after a delay, following the beginning of the transmission of the wave-train, which corresponds to the travel time of the waves over the path from the transmission point to said receiving point through a limit point of the surveyed zone and during a time interval at least as long as half a period of the transmitted wave-train, from each recording there are determined two characteristic numbers, one of the amplitude and the other of the phase of the recorded waves, and these numbers are used for restoring the diffraction points of the surfaces and the image of the transmission point with respect to the surfaces, acting as mirrors, of the considered medium, whereby said surfaces can be identified.

2. Method for exploration at a distance from surfaces and discontinuities of a surveyed medium adapted in particular to seismic prospecting of subterranean surfaces, comprising transmitting from at least one point and receiving in at least one point, waves selected from acoustic- or radio-waves, said transmission and reception points being remote from said surface, wherein there is successively transmitted from a plurality of transmission points wave-trains of substantially constant frequency and of a length at least equal to the travel time of the waves over twice the distance between two limit points of the surveyed zone, there is received and recorded at one reception point the reflected and diffracted waves after a delay, following the beginning of the transmission of each wave-train, which corresponds to the travel time of the waves over the path from the corresponding transmission point to said receiving point through a limit point of the surveyed zone, and during a time interval at least as long as half a period of the transmitted wave-train, there are determined from each recording two characteristic numbers, one of the amplitude and the other of the phase of the recorded waves, and these numbers are used for restoring the diffraction points and the image of the reception point with respect to the surfaces, acting as mirrors, of the considered medium, whereby said surfaces can be identified.

3. Method according to claim 1, wherein the recording time is equal to $\Delta t = n/f_o$, $f_o$ being the transmission frequency and n the number of recorded periods of the received waves.

4. Method according to claim 1, wherein the length of the transmitted wave train is substantially equal to the travel time of the waves from the nearest to the farthest discontinuity and back, increased by internal $t = n/f_o$, $f_o$ being the transmission frequency and n the number of recorded periods of the received waves.

5. Method according to claim 1, wherein the transmission frequency of the wave train is selected from a frequency range whose width is in inverse ratio to the distance between the limit surface to be identified in the surveyed medium.

6. Method according to claim 1, wherein the waves are simultaneously transmitted from several points and that the phase/shift between the different waves remains constant during the transmission.

7. Method according to claim 1, wherein the transmitted waves have a higher amplitude at the beginning of the transmission period than at the end thereof.

8. Device for exploration at a distance from surfaces and discontinuities of a surveyed medium, particularly adapted to seismic prospecting of subterranean surfaces comprising in combination: means for transmitting substantially monochromatic waves, means for feeding with electric signals said transmitting means, means for limiting the transmission time of said waves to said time interval, means for receiving a signal corresponding to the waves reflected by the discontinuities of the surveyed medium, means for comparing the received signal to the received noise means for limiting the recording time of the received signal, depending on the ratio of the signal to the noise, to a selected number N of periods, means for measuring the maximum amplitude of said sine-signal, means for detecting the phase shift between the signal issued from the feeding means and the sine-signal issued from the summing means, means for recording, for each of the reception means, the value of the amplitude and of the phase shift, and means for restoring the images of the transmission sources or the reception points from said values of amplitude and phase shift.

9. Device for seismic prospecting of subterranean surfaces comprising the combination of transmission means of substantially monochromatic waves comprising at least two transmission units each of which transmits an identical signal at selected different times, means for feeding with electric current said transmission means, means for limiting the transmission time of each signal to said time interval, means for receiving each signal reflected from the sub-strata, means for comparing each received signal to the received noise, means for limiting the recording time of the received signal, in dependence with the ratio signal/noise, to a number n of periods, summation means successively issuing sine-signals, each corresponding to the average of the n periods of each received signal, means for measuring the maximum amplitude of each sine-signal, means for detecting the phase shift between the signal issued from the feeding means and each sine-signal and retarding means, associate with said summation means, for determining, by combining the amplitude and phase values, an amplitude value and phase value corresponding to the amplitude and the phase which would have been obtained by simultaneously transmitting waves from these different points.

10. Method according to claim 1, comprising receiving the waves reflected from the various surfaces acting as mirrors, at a plurality of points so located that the spacing between adjacent receivers decreases with an increasing distance thereof from the transmission point.

11. Method according to claim 2, wherein the recording time is equal to $\Delta t = n/f_o$, $f_o$ being the transmission frequency and n the number of recorded periods of the received waves.

12. Method according to claim 2, wherein the length of the transmitted wave train is substantially equal to the travel time of the waves from the nearest to the farthest discontinuity and back, increased by internal $t = n/f_o$, $f_o$ being the transmission frequency and n the number of recorded periods of the received waves.

13. Method according to claim 2, wherein the transmission frequency of the wave train is selected from a frequency range whose width is in inverse ratio to the distance between the limit surface to be identified in the surveyed medium.

14. Method according to claim 2, wherein the transmitted waves have a higher amplitude at the beginning of the transmission period than at the end thereof.

* * * * *